United States Patent
Bernini

(10) Patent No.: US 12,504,542 B2
(45) Date of Patent: Dec. 23, 2025

(54) SYSTEM FOR CUTTING GRASS AND CORRESPONDING PROCESS

(71) Applicant: Fabrizio Bernini, Bucine (IT)

(72) Inventor: Fabrizio Bernini, Bucine (IT)

( * ) Notice: Subject to any disclaimer, the term of this patent is extended or adjusted under 35 U.S.C. 154(b) by 182 days.

(21) Appl. No.: 18/469,302

(22) Filed: Sep. 18, 2023

(65) Prior Publication Data

US 2024/0094404 A1   Mar. 21, 2024

(30) Foreign Application Priority Data

Sep. 20, 2022 (IT) .................. 102022000019245

(51) Int. Cl.
| | |
|---|---|
| *G01S 19/07* | (2010.01) |
| *A01D 34/00* | (2006.01) |
| *A01D 101/00* | (2006.01) |
| *G05D 1/00* | (2024.01) |

(52) U.S. Cl.
CPC .......... *G01S 19/071* (2019.08); *A01D 34/008* (2013.01); *G05D 1/0278* (2013.01); *A01D 2101/00* (2013.01)

(58) Field of Classification Search
CPC . G01S 19/071; A01D 34/008; A01D 2101/00; G05D 1/0278
See application file for complete search history.

(56) References Cited

U.S. PATENT DOCUMENTS

| | | | |
|---|---|---|---|
| 2011/0142099 A1 | 6/2011 | Poncelet born Morey | |
| 2013/0282224 A1* | 10/2013 | Yazaki | G05D 1/646 701/24 |
| 2019/0230850 A1* | 8/2019 | Johnson | B65G 67/02 |
| 2019/0339710 A1* | 11/2019 | Sørensen | G05D 1/028 |
| 2019/0369620 A1* | 12/2019 | Zhou | G05D 1/2464 |
| 2022/0158693 A1* | 5/2022 | Nakata | H04W 88/02 |

FOREIGN PATENT DOCUMENTS

| | | | | |
|---|---|---|---|---|
| EP | 3698618 A1 | 8/2020 | | |
| WO | WO-2010077198 A1 * | 7/2010 | ........... | A01D 34/008 |
| WO | WO-2022143746 A1 * | 7/2022 | | |

OTHER PUBLICATIONS

Italian Search Report dated Apr. 20, 2023 from counterpart Italian App No. IT 202200019245.

* cited by examiner

*Primary Examiner* — Hunter B Lonsberry
*Assistant Examiner* — Besufekad Lemma Tessema
(74) *Attorney, Agent, or Firm* — SHUTTLEWORTH & INGERSOLL, PLC; Timothy J. Klima

(57) ABSTRACT

A is a lawn mower system, includes, in combination:—a database; —a remote server connected to the database,—at least one GNSS antenna equipped with a GNSS receiving device designed to receive from GNSS satellites first GPS information I1 for determining GPS coordinates of the position of the antenna and a communication device configured to establish a data connection with a telecommunication network, preferably with the Internet, for transmitting, at predetermined intervals, the first GPS information I1 derived from the GNSS receiving device to the remote server, the remote server being configured for storing in the database at least partly the GPS information received from the communication device;—a lawn mower robot.

13 Claims, 2 Drawing Sheets

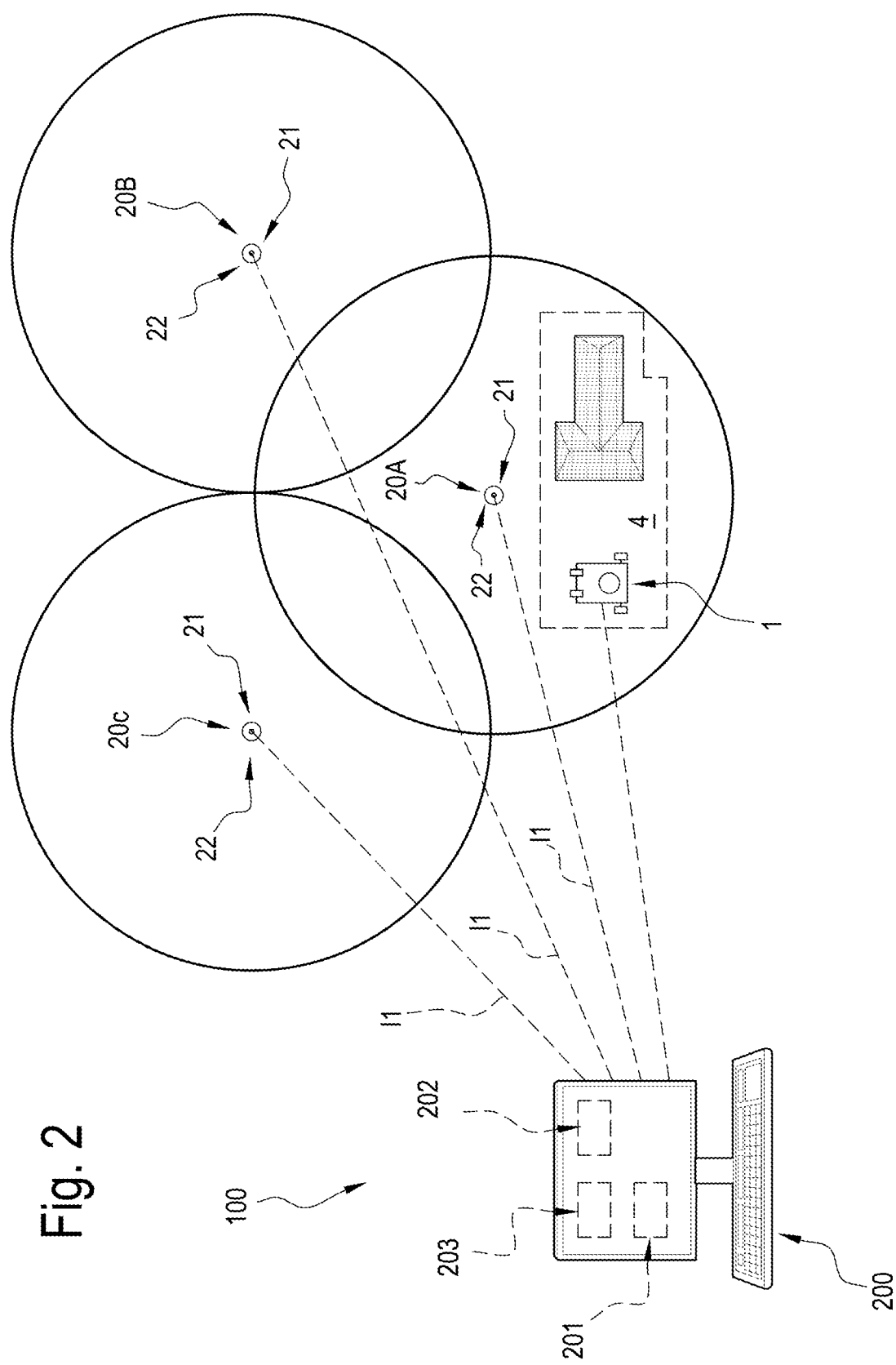

SYSTEM FOR CUTTING GRASS AND CORRESPONDING PROCESS

Figure 1:
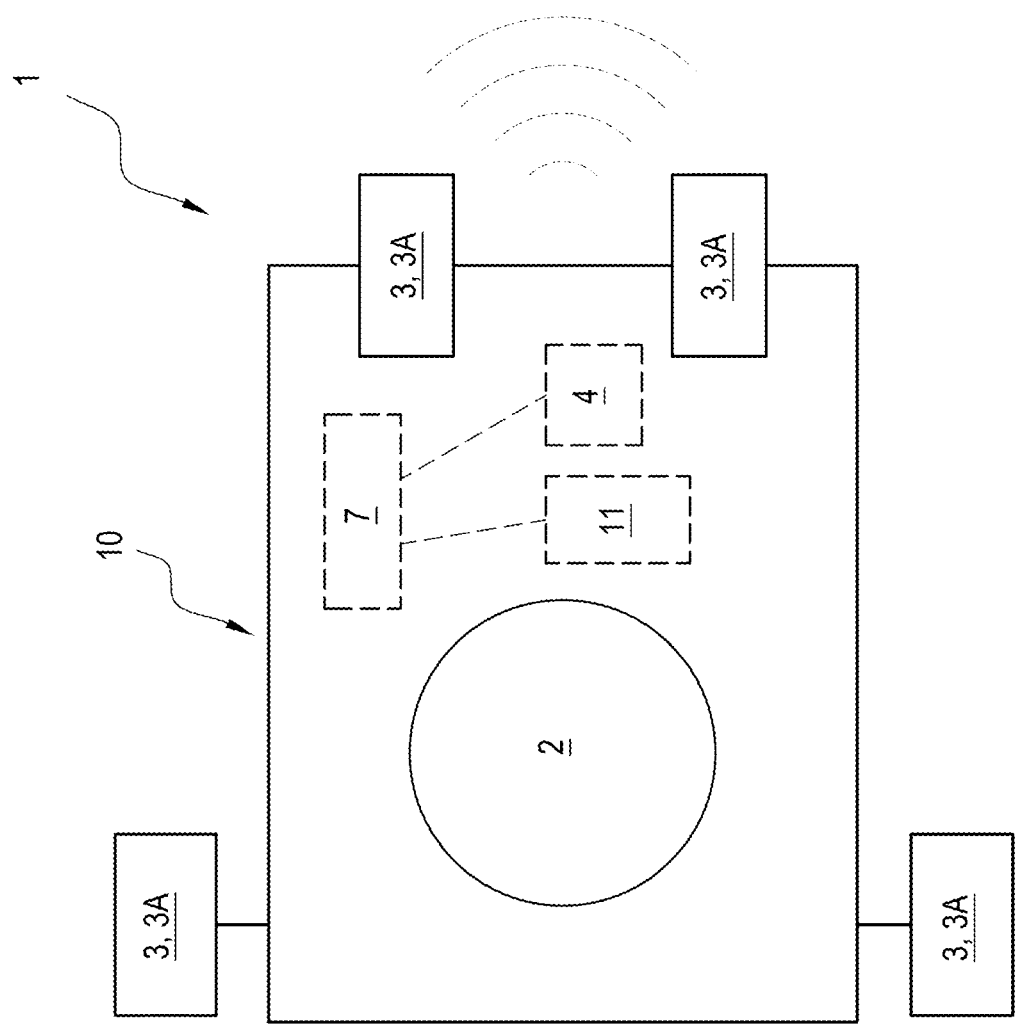

This application claims priority to Italian Patent Application No. 102022000019245 filed Sep. 20, 2022, which application is incorporated by reference herein.

This invention relates to the technical sector of automatic gardening devices, in particular lawn mower devices.

The lawn mower devices are used to keep lawns, gardens and grassy areas in general in optimum conditions, that is to say, for keeping the grass below a certain height in a substantially homogeneous manner over the entire cutting area.

Lawn mower robots of known type generally comprise a load-bearing frame, often having an outer body, to which are associated cutting means for the maintenance of the lawn and robot movement means for moving the robot inside a working area.

There are prior art systems which use the GPS localisation technology for cutting grass.

However, these prior art systems comprise, during installation, a necessary initial mapping of the working area and obstacles inside it to be loaded in the lawn mower robot.

It has also been noted that these systems are affected by a significant reduction in the precision of the GPS signal close to certain elements, for example plants, walls or hedges, or in zones in which the satellite reception is poor.

In this context, the technical purpose which forms the basis of the invention is to provide a system for cutting grass and a corresponding process which is particularly reliable and effective, and is able to operate in any condition.

In particular, the aim of the invention is to provide grass cutting system and a corresponding process which is simple, reliable and particularly flexible, that is to say, which can be used effectively in the most diverse operating conditions.

The features of the invention are clearly described in the claims below and its advantages are more apparent from the detailed description which follows, with reference to the accompanying drawings which illustrate a preferred, non-limiting example embodiment of the invention and in which:

FIG. 1 is a schematic view of an embodiment of the lawn mower robot according to the invention;

FIG. 2 schematically illustrates a view of the grass cutting system according to the invention.

It should be noted that the drawings are schematic representations and do not therefore represent the actual dimensions.

The invention describes a lawn mower system 100, characterised in that it comprises, in combination:

a database 201;

a remote server 200 connected to said database 201, at least one GNSS antenna 20A equipped with a GNSS receiving device 21 designed to receive from satellites first GPS information I1 for determining GPS coordinates of the position of said antenna 20 and a communication device 22 configured to establish a data connection with a telecommunication network, preferably with the Internet, for transmitting, at predetermined intervals, the first GPS information I1 derived from the GNSS receiving device 21 to said remote server 200, the remote server 200 being configured for storing in the database 201 at least partly the GPS information received from the communication device 22.

It should be noted that the remote server 200 is defined by a remote processor, connectable to a network, preferably the Internet, by means of a connecting device 202.

The database 201 is a memory, of the concentrated type (that is, present in a single processor) or distributed type (cloud).

The connection between the database 201 and the remote processor may be performed through the Internet, using the connecting device 202, or the database 201 may be integrated in the remote server 200.

According to the invention, the system 100 further comprises a lawn mower robot 1 comprising:

grass cutting means 2 for performing an operation for cutting grass, movement means 3 configured for moving the lawn mower robot 1, a GNSS receiving device 4 of the RTK type, configured to receive from GNSS satellites second GPS information to determine GPS coordinates regarding a GPS position of the robot 1, a communication device 11 configured to establish a data connection with a telecommunication network, preferably with the Internet, a processing module 7, operatively coupled to the GPS device 4 and to the communication device 11 and configured for transmitting to the remote server 200, using the communication device 11, GPS coordinates of the GPS position of the robot 1.

The remote server 200 is configured for sending to the communication device 11 of the robot 1 GPS correction information of the GPS position of the robot 1 derived from the information received from the GNSS satellites from the GNSS receiving device 21 of said GNSS antenna 20 and/or present in the database 201 for said GNSS antenna 20.

Said processing module 7 is configured for calculating, on the basis of the GPS correction information and the GPS coordinates of the GPS position of the robot 1 received from the GNSS receiving device 4 of the RTK type, a correct GPS position of the robot 1, according to a differential GPS positioning technique.

Advantageously, according to this technique, the correct GPS position is particularly accurate.

It should also be noted that the fact of having a remote server 200 makes it possible to optimise the data flow in the case of a multiplicity of robots 1: in effect, the antenna 20A, 20B, 20C sends the first GPS information, also comprising the relative GPS positions towards a single point (the remote server 200) and it is the remote server 200 which activates the data flow (regarding the GPS correction information) towards the robot 1, on request.

Preferably, the data (correction information) from the remote server 200 towards the communication device 11 of the robot 1 are sent.

In this way, there is no specific 1-1 connection between antenna 20A and robot 1, whilst, on the other hand, it is the remote server which is interposed, optimising the data flow thanks to this architecture.

It should be noted that the expression "GPS correction information" is used to mean a plurality of data which may comprise at least a portion of the first GPS information I1 and/or the information present in the database 201.

The "GPS correction information" may include GPS positions of antenna 20A.

The "GPS correction information" may include GNSS satellite identification information whose first information was received by the antenna 20A.

Since the antenna 20A is positioned at an optimum distance relative to the robot 1 (preferably less than 30 km, even more preferably less than 20 km, with a further preference of less than 15 km), the correction derived by the robot 1 using the first GPS information I1 of the antenna 20A is an optimum correction also for the robot 1, that is to say, which can be applied to the GPS position of the robot 1, improving the accuracy of the GPS position acquired by the GNSS receiving device 4 of the RTK type.

In this way, the correct GPS position can be used by the processing module 7 to allow a particularly reliable movement.

In this description, for brevity, reference will be made to the lawn mower robot 1 simply as the robot 1.

According to the invention, the robot 1 comprises a frame 10 for supporting the components of the robot 1.

The robot 1 comprises grass cutting means 2, coupled to the supporting frame 10, configured to perform an operation for cutting grass inside a cutting zone A.

The cutting zone A may be, for example, a garden, a park or in general a lawn.

The grass cutting means 2 face towards the grass and comprise grass cutting elements, for example, one or more blades.

According to an aspect of the invention, the cutting means 2 comprise an actuator, not illustrated in the accompanying drawings, configured for moving said grass cutting elements.

According to the invention, the robot 1 comprises movement means 3, coupled to the supporting frame 10, configured for moving the robot 1.

The GNSS receiving device 4 of the RTK type is configured to derive coordinates regarding a GPS position of the robot 1.

Advantageously, a GPS type device 4 which uses RTK technology, that is to say, measurements of satellite data with respect to a fixed ground station (antenna 20A), makes it possible to obtain information with a greater degree of precision compared with the standard GPS systems.

The term "coupled" means that the communication device 11 and the GPS type device 4 are connected to, and in communication with, the processing module 7.

According to an aspect of the invention, the movement means 3 are configured for moving the robot 1 along a feed direction X.

Preferably, the movement means 3 comprise a plurality of wheels 3A.

Preferably, at least one wheel 3A is a drive wheel and the movement means 3 comprise a rotation motor (not illustrated), operatively connected to said at least one drive wheel.

Still more preferably, at least one wheel 3A is a wheel which can be oriented, that is to say, a wheel which is able to rotate about a substantially vertical axis of rotation, and the movement means 3 comprise an orientation motor (not illustrated) operatively connected to said at least one wheel which can be oriented.

In particular, the drive wheels allow the forward movement along the feed direction, whilst the adjustable wheels change the feed direction when necessary (for example, when obstacles are detected along the working trajectory or the edges of the area to be maintained are reached).

By way of example, and therefore non-limiting, the power supply of the robot 1, both with regard to the movement means 3 and the cutting means 2, may be performed by electric motors, powered by a battery; the latter may be of the rechargeable type (not illustrated).

Preferably, the battery may also power other electrical/electronic devices provided on the lawn mower robot 1.

The processing module 7 is configured for controlling the movement means 3 of the GPS coordinates stored in the storage unit 8 (and of a trajectory stored in the processing module 7 or received, for example received from the remote server 200).

According to another aspect, the at least one GNSS antenna 20A comprises a plurality of antennas 20A, 20B, 20C, each equipped with a GNSS receiving device 21 designed to receive signals from GNSS satellites (first GPS information) for deriving GPS coordinates of the position of said GNSS antenna 20A, 20B, 20C and of a communication device 22 configured to establish a data connection with a telecommunication network, preferably with the Internet, for transmitting, at predetermined intervals, the GPS coordinates of the position of said antenna 20A, 20B, 20C GNSS, derived from the GNSS receiving device 21, to said remote server 200. According to this aspect, the remote server 200 is configured for storing the coordinates of the GPS position of said GNSS antennas 20A, 20B, 20C in the database 201.

According to another aspect, the remote server 200 is configured for storing a part of the first GPS information I1 of said GNSS antennas 20A, 20B, 20C in the database 201.

The fact of having several antennas 20A, 20B, 20C GNSS allows larger areas to be covered, that is to say, the robot can also be taken to areas geographically distant from each other and be able to operate correctly, that is to say, the correct GPS position can be calculated in a particularly reliable manner even over a large geographical area.

Moreover, the correct GPS position, being particularly reliable, allows the robot 1 to operate in any condition, for example even in the presence of obstacles or in zones which can degrade the quality of the GPS signal received from the robot 1.

In these circumstances, the correct GPS position, calculated by the processing module 7, allows the robot 1 to operate in a particularly reliable manner.

It should be noted that the correct GPS position is the basis for moving the robot 1 (the more accurate is the GPS position derived from the processing module 7 the greater is the precision in cutting and managing the obstacles by the robot 1).

According to another aspect, the remote server 200 is configured for:
- comparing said coordinates of the GPS position in which the robot 1 is positioned with a plurality of GPS coordinates of the GNSS antennas 20A, 20B, 20C;
- determining, by means of said comparison, a GPS antenna 20A having, among said GPS antennas 20A, 20B, 20C, a smaller distance than the GPS position in which the robot 1 is positioned;
- sending to the communication device 11 of the robot 1 information for GPS correction of the GPS position of the robot 1 derived on the basis of the first GPS information I1 received from the antenna 20A and/or the information present in the database 201 for said antenna 20A having a smaller distance relative to the localisation point in which the robot 1 is positioned.

According to this embodiment, the antenna 20A closest to the position of the robot is used to calculate the correct GPS position.

In this way, the correction applied by the robot 1 is optimum for improving the accuracy: in effect, the closest antenna 20A is in all probability the antenna the correction for which, compared with the others, is better for the robot 1 (in particular for the GPS position where the robot 1 is located).

According to another aspect, the remote server 100 is configured for detecting a malfunction of the antenna 20A.

In the case of detection of a malfunction of the antenna 20A having a smaller distance than the localisation position in which the robot 1 is positioned, that is, the first antenna 20A, the remote server 200 is configured to determine, by means of said comparison, a further second GNSS antenna 20B having, among said GPS antennas 20A, 20B, 20C excluding the first antenna 20A, the smaller distance relative to the localisation position in which the robot 1 is positioned.

In short, the correction which is sent the communication device 11 of the robot 1 from the remote server 200 in the case of a malfunction of the antenna at the least distance corresponds to that of the second closest active antenna (since the first antenna is malfunctioning, the correction of the second antenna is sent in order of distance).

In this way, the system 1 is able to manage in an effective manner the operation of the robot 1, even in the case of a malfunction of one or more antennas.

According to another aspect, the communication device 22 is configured for transmitting, at predetermined intervals, identification information of the GNSS satellites whose GPS signals have been received from the GNSS receiving device 21 and wherein the processing module 7 is configured for transmitting to the remote server 200 identification information of the GNSS satellites whose GPS signals have been received from the GNSS receiving device 4 of the RTK type.

In essence, the remote server 200 receives the list of the GNSS satellites which can be received by the robot 1 and the list of the GNSS satellites which can be received by each antenna 20A, 20B, 20C, where "which can be received" means the fact that the signal of that satellite is received (preferably within a certain power level).

Preferably, but not necessarily, the list of GNSS satellites which can be received by the robot 1 and/or the list of GNSS satellites which can be received by each antenna 20A, 20B, 20C are stored in the database 201.

According to this aspect, the remote server 200 is configured for:
  comparing for each GNSS antenna 20A, 20B, 20C, the GNSS satellites whose first GPS information I1 has been received by the GNSS receiving device 21 of said antennas 20A, 20B, 20C with the GNSS satellites whose second GPS information has been received by the GNSS receiving device 4 of the RTK type;
  determining, by means of said comparison, a GPS antenna 20A having, among said GPS antennas 20A, 20B, 20C, the largest number of GNSS satellites for which the first information has been received in common with the GNSS satellites for which second GPS information has been received by the GNSS receiving device 4 of the RTK type;
  sending to the communication device 11 of the robot 1 GPS correction information of the GPS position of the robot 1 derived from the first GPS information I1 received from the GNSS satellites from the GNSS receiving device 21 of said GNSS antenna 20A and/or present in the database 201 for said GNSS antenna 20A, said GPS correction information being relative to said antenna 20A having the greatest number of GNSS satellites transmitting the first GPS 11 information to the GNSS receiving device 21 in common with GNSS satellites whose second information has been received by the GNSS receiving device 4 of the RTK type.

Basically, according to this aspect, the correction of the GPS position which is sent by the remote server 200 to the communication device 11 of the robot 1 corresponds to the antenna 20A which has more GNSS satellites which can be received in common with those which can be received by the robot 1, where "which can be received" means the fact that the signal of that GNSS satellite is received (preferably within a certain power level).

The fact that the antenna 20A which is used for the correction has the greatest number of satellites which can be received in common with the robot means that the correction is appropriate and accurate for the robot 1, since it is derived from the same or substantially the same set of GNSS satellites.

According to another aspect, in the case of detection of a malfunction of the above-mentioned antenna 20A having the greatest number of GNSS satellites in common with the GNSS satellites whose signals have been received from the RTK type GNSS receiving device 4, that is, the first antenna 20A, the remote server 200 is configured to determine, by means of said comparison, a further second GNSS antenna 20B having, between said GPS antennas 20A, 20B, 20C excluding the above-mentioned first antenna 20A, the greatest number of GNSS satellites in common with the GNSS satellites whose signals have been received from the RTK type GNSS receiving device 4.

According to another aspect, the communication device 11 of the robot 1 and/or the communication device 22 of the antenna 20 comprises a wireless communication module.

According to yet another aspect, the communication device 11 of the robot 1 and/or the communication device 22 of the antenna 20 comprises a 4G mobile type communication module.

According to another aspect, the communication device 11 of the robot 1 and/or the communication device 22 of the antenna 20 comprises a mobile GPRS telephone device, configured to be able to exchange data traffic.

According to yet another aspect, said antennas 20A, 20B, 20C GNSS are positioned, relative to said robot 1, at a predetermined distance of less than 30 km, even more preferably less than 20 km.

It should be noted that, experimentally, it has been verified that these distances make it possible to optimise the number of antennas scattered in a certain territory with respect to the accuracy of the correct GPS position: in essence, the optimum condition of coverage can be obtained by applying antennas 20A, 20B, 20C trying to cover the territory in such a way that from each point (in which the robot 1 could operate) there is an antenna 20A, 20B, 20C within the predetermined distance.

According to another aspect, the remote server 200 is configured for sending to the communication device 11 of the robot 1 a trajectory to be followed for cutting a cutting zone.

According to this aspect, the processing module 7 of the robot 1 is configured for controlling the movement means 3 of the lawn mower robot 1 on the basis of said trajectory and the correct GPS position.

In short, the remote server 200, according to this aspect, comprises a memory 203 in which trajectories are present, in association with predetermined robots 1.

For this reason, the remote server 200 transmits movement information to the processing module 7, which is used by the processing module 7 together with the correct GPS position to control the movement means 3 and cut the cutting area A.

Some aspects relating to the antenna 20A and/or plurality of antennas 20A, 20B, 20C are described below in more detail.

According to a first aspect, preferably but not necessarily, upon the installation of a new antenna 20A the "real" position of the antenna is stored in the database 201, where the term "real" position means a position calculated with a plurality of modes and therefore considered particularly reliable.

This "real" position of the antenna 20A may define, together with other data, the above-mentioned correction information.

For example, the installer may use a combination of techniques for deriving the "real" position of the antenna.

The "real" position is used in combination with the first GPS information I1 derived from the GNSS satellites for calculating the correct GPS position of the robot 1.

According to a second aspect, the real position of the antenna 20A is calculated by acquiring first GPS information I1 in a predetermined time interval. This time interval is sufficiently large to allow the antenna 20A to receive the first GPS information from the GNSS satellites, and consequently calculate the GPS coordinates, using a plurality of GNSS satellites and/or with the same set of GNSS satellites in different positions of the sky. In short, according to this aspect, the real position of the antenna 20A is a mathematical function of a plurality of GPS positions acquired over time.

Preferably, but not necessarily, the real GPS position of the antenna 20A is an average of these positions, over time.

The real position for a specific antenna 20A is preferably stored in the database 201 in association with the antenna 20A itself.

The correction information, sent by the remote server 200 to the communication device 11 of the robot 1, preferably comprises the real position.

Further, the correction information also comprises at least a part (or all) of the first GNSS information of a specific selected antenna.

According to another preferred embodiment, the communication device 11 of the robot 1 sends the GPS position of the robot 1 to the remote server 200 only at predetermined operating steps, for example at the start of the working phase, that is to say, at the start of the cut or when about to start the cut.

Alternatively, the communication device 11 of the robot 1 sends the GPS position of the robot 1 to the remote server 200 at predetermined time intervals, preferably less than 20 seconds, even more preferably less than 10 seconds, most preferably less than 5 seconds.

Preferably, said time intervals correspond to a second.

It should be noted that the remote server 200 sends the correction information to the communication device 11 of the robot 1 at predetermined time intervals, preferably less than 20 seconds, even more preferably less than 10 seconds, most preferably less than 5 seconds.

The invention relates to a cutting process of a cutting zone A.

According to the invention, the cutting process comprises the following steps:

preparing a cutting system 100 according to any one of the aspects described above as in the accompanying claims;

transmitting to the remote server 200 GPS coordinates of a GPS position of the robot 1;

transmitting, at predetermined intervals, the first GPS information I1 received from the GNSS receiving device 21 of said GNSS antenna 20A to said remote server 200;

storing at least a portion of the first GPS information I1 of said antenna 20A in the database 201;

sending to the communication device 11 of the robot 1 GPS correction information of the GPS position derived from the first GPS information I1 received from the GNSS satellites from the GNSS receiving device 21 of said GNSS antenna 20 and/or present in the database 201 for said GNSS antenna 20;

calculating, using said processing module 7, on the basis of the GPS correction information and the GPS coordinates received from the GNSS receiving device 4 of the RTK type, a correct GPS position, according to a differential GPS positioning technique;

controlling the movement means 3 of the robot 1, for cutting the grass in a cutting zone A, as a function of said correct GPS position.

According to another aspect, the step of preparing a cutting system 100 comprises a step of preparing a plurality of GNSS antennas 20A, 20B, 20C, each equipped with a GNSS receiving device 21 designed to receive from GNSS satellites first GPS information I1 for deriving GPS coordinates of the position of said GNSS antenna 20A, 20B, 20C and a communication device 22 configured to establish a data connection with a telecommunication network, preferably with the Internet, for transmitting, at predetermined intervals, the first GPS information I1 received from the GNSS receiving device 21 of said antenna to said remote server 200.

The remote server 200 is configured for storing at least a part of said first GPS information I1 of said GNSS antennas 20A, 20B, 20C in the database 201, and wherein:

the step of sending to the communication device 11 of the robot 1 GPS correction information derived on the basis of the first GPS information I1 received from the GNSS satellites from the GNSS receiving device 21 of said GNSS antenna 20A and/or present in the database 201 for said GNSS antenna 20A comprises a step of selecting one of said GNSS antennas 20A, 20B, 20C, and to transmit GPS correction information of the GPS position of the robot 1 derived on the basis of the GPS information received from the GNSS satellites from the GNSS receiving device 21 of said GNSS antenna 20 and/or present in the database 201 for said selected antenna 20A.

According to yet another aspect, the step of selecting one of said GNSS antennas 20A, 20B, 20C comprises a step of:

comparing for each GNSS antenna 20A, 20B, 20C, the GNSS satellites whose first GPS information I1 has been received by the GNSS receiving device 21 of said antennas 20A, 20B, 20C with the GNSS satellites whose second GPS information has been received by the GNSS receiving device 4 of the RTK type;

determining, by means of said comparison, a GPS antenna 20A having, among said GPS antennas 20A, 20B, 20C, the largest number of GNSS satellites for which the first information has been received in common with the GNSS satellites for which second GPS information has been received by the GNSS receiving device 4 of the RTK type and selecting said antenna 20A having the largest number of GNSS satellites in common.

According to yet another aspect, the step of selecting one of said GNSS antennas 20A, 20B, 20C comprises a step of:

comparing said coordinates of the GPS position in which the robot 1 is positioned with a plurality of GPS coordinates of the GNSS antennas 20A, 20B, 20C, determining, by means of said comparison, a GPS antenna 20A having, among the GPS antennas 20A, 20B, 20C, a smaller distance than the GPS position in which the robot 1 is positioned and selecting said antenna having a smaller distance and selecting said antenna 20A having a smaller distance.

The invention claimed is:

1. A lawn mower system, comprising, in combination:
   a database;
   a remote server connected to said database,
   a plurality of GNSS antennas, each of said GNSS antennas including:
     a GNSS receiving device configured to receive from GNSS satellites first GPS information for determining GPS coordinates of a position of said each of said GNSS anntennas, and
   an antenna communication device configured to establish a data connection with a telecommunication network, for transmitting, at predetermined intervals, the first GPS information derived from the GNSS receiving device of the position of said each of said GNSS antennas to said remote server, the remote server being configured for storing in the database at least partly the first GPS information received from each antenna communication device;
   a lawn mower robot, comprising:
     a grass cutting device, including a blade for performing an operation for cutting grass,
     a movement mechanism including at least one motor configured for moving the lawn mower robot,
     a further GNSS receiving device with an RTK configuration, configured to receive from GNSS satellites second GPS information to determine GPS coordinates regarding a GPS position of the robot,
     a mower communication device configured to establish a data connection with the telecommunication network,
     a processing module, operatively coupled to the further GNSS receiving device and to the mower communication device and configured for transmitting to the remote server, by the mower communication device, GPS coordinates of the GPS position of the robot and wherein the remote server is configured to send to the mower communication device GPS correction information of the GPS position of the robot derived from the information received from the GNSS satellites from the GNSS receiving device of said GNSS antenna and/or present in the database for said GNSS antenna, said processing module being configured to calculate, based on the GPS correction information and the GPS coordinates of the GPS position of the robot received from the further GNSS receiving device, a correct GPS position of the robot, according to a differential GPS positioning technique;
   wherein each antenna communication device is configured for transmitting, at predetermined intervals, identification information of the GNSS satellites and the first GPS information which has been received by the respective GNSS receiving device;
   wherein the processing module is configured for transmitting to the remote server the identification information of the GNSS satellites whose second GPS information has been received by the further GNSS receiving device;
   wherein the remote server is configured for:
     comparing for each of the GNSS antennas, the GNSS satellites whose first GPS information has been received by the GNSS receiving device of said GNSS antennas with the GNSS satellites whose second GPS information has been received by the further GNSS receiving device;
     determining, by said comparison, one of said GNSS antennas having, among said GNSS antennas, a largest number of GNSS satellites for which the first GPS information has been received in common with the GNSS satellites for which second GPS information has been received by the further GNSS receiving device;
     sending to the mower communication device the GPS correction information of the GPS position of the robot derived from the first GPS information received from the GNSS satellites from the GNSS receiving device of said one of said GNSS antennas having the largest number of GNSS satellites and/or present in the database for said one of said GNSS antennas having the largest number of GNSS satellites, said GPS correction information being relative to said one of said GNSS antennas having the largest number of GNSS satellites.

2. The lawn mower system according to claim 1, wherein the remote server is configured for:
   comparing, at predetermined time intervals, said GPS coordinates of the GPS position of the robot with a plurality of GPS coordinates of the positions of the GNSS antennas;
   determining, by said comparison, one of said GNSS antennas having, among said GNSS antennas, a smaller distance than the GPS position in which the robot is positioned;
   sending to the mower communication device GPS correction information of the GPS position of the robot derived from the information received from the GNSS satellites from the GNSS receiving device of said one of said GNSS antennas having the smaller distance and/or present in the database for said one of said GNSS antennas having the smaller distance, said GPS correction information being relative to said one of said GNSS antennas having the smaller distance.

3. The lawn mower system according to claim 2, wherein in a case of detection of a malfunction of the one of said GNSS antennas having the smaller distance, the remote server is configured to determine, by said comparison, a second one of said GNSS antennas having, among remaining ones of said GNSS antennas when excluding the one of said GNSS antennas having the smaller distance, a second smaller distance relative to the GPS position in which the robot is positioned.

4. The lawn mower system according to claim 1, wherein in a case of detection of a malfunction of said one of said GNSS antennas having the largest number of GNSS satellites, the remote server is configured to determine, by said comparison, a further second GNSS antenna having, among remaining ones of said GNSS antennas when excluding said one of said GNSS antennas having the largest number of GNSS satellites, a second largest number of GNSS satellites transmitting the first GPS information to the GNSS receiving device in common with the GNSS satellites for which second GPS information has been received by the further GNSS receiving device.

5. The lawn mower system according to claim 1, wherein the mower communication device and/or at least one of the antenna communication devices comprises a wireless communication module.

6. The lawn mower system according to claim 1, wherein the mower communication device and/or at least one of the antenna communication devices comprises a 4G mobile communication module.

7. The lawn mower system according to claim 1, wherein the mower communication device and/or at least one of the antenna communication devices comprises a mobile GPRS telephone device, configured to exchange data traffic.

8. The lawn mower system according to claim 1, wherein the GNSS antennas are positioned, relative to said robot, at a distance of less than 30 km.

9. The lawn mower system according to claim 1, wherein the remote server is configured to send to the mower communication device a trajectory to be followed for cutting a cutting zone, the processing module being configured to control the movement mechanism based on said trajectory and the correct GPS position.

10. A method for cutting a cutting zone comprising the following steps:
   providing a lawn mower system, comprising:
      a database;
      a remote server connected to said database,
      a plurality of GNSS antennas, each of said GNSS antennas including:
         a GNSS receiving device configured to receive from GNSS satellites first GPS information for determining GPS coordinates of a position of said each of said GNSS anntennas, and
         an antenna communication device configured to establish a data connection with a telecommunication network, for transmitting, at predetermined intervals, the first GPS information derived from the GNSS receiving device of the position of said each of said GNSS antennas to said remote server, the remote server being configured for storing in the database at least partly the first GPS information received from each antenna communication device;
      a lawn mower robot, comprising:
         a grass cutting device, including a blade for performing an operation for cutting grass,
         a movement mechanism including at least one motor configured for moving the lawn mower robot,
         a further GNSS receiving device with an RTK configuration, configured to receive from GNSS satellites second GPS information to determine GPS coordinates regarding a GPS position of the robot,
         a mower communication device configured to establish a data connection with the telecommunication network,
         a processing module, operatively coupled to the further GNSS receiving device and to the mower communication device and configured for transmitting to the remote server, by the mower communication device, GPS coordinates of the GPS position of the robot and wherein the remote server is configured to send to the mower communication device GPS correction information of the GPS position of the robot derived from the information received from the GNSS satellites from the GNSS receiving device of said GNSS antenna and/or present in the database for said GNSS antenna, said processing module being configured to calculate, based on the GPS correction information and the GPS coordinates of the GPS position of the robot received from the further GNSS receiving device, a correct GPS position of the robot, according to a differential GPS positioning technique;
   transmitting to the remote server the GPS coordinates of the GPS position of the robot;
   transmitting, at predetermined intervals, the first GPS information received from the GNSS receiving device of said GNSS antenna to said remote server;
   storing at least a portion of the first GPS information of said antenna in the database;
   sending to the mower communication device GPS correction information of the GPS position derived from the first GPS information received from the GNSS satellites from the GNSS receiving device of said GNSS antenna and/or present in the database for said GNSS antenna;
   calculating, using said processing module, on the basis of the GPS correction information and the GPS coordinates received from the further GNSS receiving device, a correct GPS position, according to a differential GPS positioning technique;
   controlling the movement mechanism of the robot, for cutting the grass in a cutting zone, as a function of said correct GPS position;
   wherein the step of sending to the mower communication device the GPS correction information comprises a step of selecting one of said GNSS antennas, and transmitting the GPS correction information of the GPS position of the robot derived on the basis of the first GPS information received from the GNSS satellites from the GNSS receiving device of said one of said GNSS antennas and/or present in the database for said one of said GNSS antennas;
   wherein the step of selecting one of said GNSS antennas comprises a step of:
      comparing for each of the GNSS antennas, the GNSS satellites whose first GPS information has been received by the GNSS receiving device of said GNSS antennas with the GNSS satellites whose second GPS information has been received by the further GNSS receiving device;
      determining, by said comparison, said one of said GNSS antennas having, among said GNSS antennas, a largest number of GNSS satellites for which the first GPS information has been received in common with the GNSS satellites for which the second GPS information has been received by the further GNSS receiving device and selecting said one of said GNSS antennas having the largest number of GNSS satellites in common.

11. The method according to claim 10, wherein the step of selecting one of said GNSS antennas comprises a step of:
   comparing said coordinates of the GPS position in which the robot is positioned with the GPS coordinates of the GNSS antennas,
   determining, by said comparison, one of said GNSS antennas having, among the GNSS antennas, a smaller distance than the GPS position in which the robot is positioned and selecting said one of said GNSS antennas having the smaller distance.

12. The lawn mower system according to claim 8, wherein the GNSS antennas are positioned, relative to said robot, at a distance of less than 20 km.

13. A lawn mower system, comprising, in combination:
   a database;
   a remote server connected to said database,
   a plurality of GNSS antennas, each of said GNSS antennas including:
      a GNSS receiving device configured to receive from GNSS satellites first GPS information for determining GPS coordinates of a position of said each of said GNSS anntennas, and an antenna communication device configured to establish a data connection with a telecommunication network, for transmitting, at predetermined intervals, the first GPS information derived from the GNSS receiving device of the position of said each of said GNSS antennas to said remote server, the remote server being configured for storing in the database at least partly the first GPS information received from each antenna communication device;

a lawn mower robot, comprising:
  a grass cutting device, including a blade for performing an operation for cutting grass,
  a movement mechanism including at least one motor configured for moving the lawn mower robot,
  a further GNSS receiving device with an RTK configuration, configured to receive from GNSS satellites second GPS information to determine GPS coordinates regarding a GPS position of the robot,
  a mower communication device configured to establish a data connection with the telecommunication network,
  a processing module, operatively coupled to the further GNSS receiving device and to the mower communication device and configured for transmitting to the remote server, by the mower communication device, GPS coordinates of the GPS position of the robot and wherein the remote server is configured to send to the mower communication device GPS correction information of the GPS position of the robot derived from the information received from the GNSS satellites from the GNSS receiving device of said GNSS antenna and/or present in the database for said GNSS antenna, said processing module being configured to calculate, based on the GPS correction information and the GPS coordinates of the GPS position of the robot received from the further GNSS receiving device, a correct GPS position of the robot, according to a differential GPS positioning technique;

wherein each antenna communication device is configured for transmitting, at predetermined intervals, identification information of the GNSS satellites and the first GPS information which has been received by the respective GNSS receiving device;

wherein the processing module is configured for transmitting to the remote server the identification information of the GNSS satellites whose second GPS information has been received by the further GNSS receiving device;

wherein the remote server is configured for:
  comparing for each of the GNSS antennas, the GNSS satellites whose first GPS information has been received by the GNSS receiving device of said GNSS antennas with the GNSS satellites whose second GPS information has been received by the further GNSS receiving device;
  determining, by said comparison, one of said GNSS antennas having, among said GNSS antennas, a largest number of GNSS satellites for which the first GPS information has been received in common with the GNSS satellites for which second GPS information has been received by the further GNSS receiving device;

wherein in a case of detection of a malfunction of said one of said GNSS antennas having the largest number of GNSS satellites, the remote server is configured to determine, by said comparison, a further second GNSS antenna having, among remaining ones of said GNSS antennas when excluding said one of said GNSS antennas having the largest number of GNSS satellites, a second largest number of GNSS satellites transmitting the first GPS information to the GNSS receiving device in common with the GNSS satellites for which second GPS information has been received by the further GNSS receiving device.

* * * * *